United States Patent [19]

Hogen Esch

[11] Patent Number: 4,748,936
[45] Date of Patent: Jun. 7, 1988

[54] METHOD AND APPARATUS FOR AUTOMATICALLY APPLYING A MILKING CLUSTER

[75] Inventor: Johannes H. L. Hogen Esch, Aalten, Netherlands

[73] Assignee: N.V. Nederlandsche Apparateneabriek Nedap, DE Groenlo, Netherlands

[21] Appl. No.: 885,779

[22] Filed: Jul. 15, 1986

[30] Foreign Application Priority Data

Jul. 16, 1985 [NL] Netherlands .................. 8502039

[51] Int. Cl.⁴ .............................................. A01S 5/00
[52] U.S. Cl. .................. 119/14.02; 119/14.14
[58] Field of Search ........................ 119/14.02, 14.14

[56] References Cited

U.S. PATENT DOCUMENTS

| 4,010,714 | 3/1977 | Notsuki et al. | 119/14.03 |
| 4,508,058 | 4/1985 | Sakobsen et al. | 119/14.02 |

FOREIGN PATENT DOCUMENTS

| WO82/00526 | 2/1982 | European Pat. Off. | |
| 164442 | 12/1985 | European Pat. Off. | 119/14.14 |
| 188303 | 7/1986 | European Pat. Off. | 119/14.14 |
| 191517 | 8/1986 | European Pat. Off. | 119/14.14 |
| 2408300 | 6/1979 | France . | |
| 2133151 | 7/1984 | United Kingdom . | |
| 2136999 | 9/1984 | United Kingdom | 119/14.14 |

OTHER PUBLICATIONS

D. Orloff, "Melkzeuge Automatisch Ansetzen-Demnächst Wirklichkeit," Landtechnik, vol. 35, No. 5, May 1980, pp. 222-224.

Primary Examiner—Carl D. Friedman
Assistant Examiner—Creighton Smith
Attorney, Agent, or Firm—Fleit, Jacobson, Cohn & Price

[57] ABSTRACT

A method of, and apparatus for, automatically applying a milking cluster. An animal to be milked and the milking cluster are first coarsely positioned relatively to each other, followed by detecting the position of at least the animal's teats relative to at least the teat cups of the milking cluster by means of ultrasonorous waves, then accurately positioning the teat cups of the milking cluster relatively to the teats, starting from the detected position of the teats, and finally applying the teat cups to the teats.

38 Claims, 2 Drawing Sheets

METHOD AND APPARATUS FOR AUTOMATICALLY APPLYING A MILKING CLUSTER

This invention relates to a method of automatically applying a milking cluster, and to apparatus for carrying out said method.

With the progress of automation in dairy farming, there has grown a need for a possibility of automatic milking without supervision.

It is an object of the present invention to fill this need. For this purpose, according to the invention, there is provided a method of automatically applying a milking cluster, characterized by the steps of coarsely positioning an animal to be milked and the milking cluster relatively to each other; accurately detecting the position of at least the animal's teats relative to at least the teat cups of the milking cluster by means of ultrasonorous waves; accurately positioning the teat cups of the milking cluster relatively to the teats, starting from the detected position of the teats, and applying the teat cups to the teats.

The method according to the invention can, with advantage, be combined with the automatic supply of food, adapted to each individual animal, which is already being used in many farms. Such automatic food supply can be realized, for example, by means of an electronic cow recognition system, developed and marketed by the present applicant, in which each cow carries a collar-responder which in an electromagnetic interrogation field generates a unique code. After the recognition of the code by a detector, the desired amount and kind of food is supplied to the cow on the basis of the data concerning the cow, stored in a computer memory. The food is commonly supplied in a feeding box, which accommodates one cow only. As soon as the cow is in such a box, therefore, she is already coarsely positioned, while her identity is also known. Starting from the cow's coarse position, which, however, can in principle also be realized by different means, a milking cluster can be applied automatically, as will be described hereinafter.

It is noted that the coarse positioning may be realized by different means. Furthermore, in order that milking can be carried out entirely without supervision, it is desirable that the identity of the milked cow is known, in order that it can be recorded which cow has given the amount of milk taken. As stated above, this identity is indeed known when the automatic individual food supply system is used. It should be noted that the automatic application of the milking cluster does not by itself require that the cow's identity is known. As will be explained hereinafter, however, it is possible, with advantage, to use certain data relating to an individual cow in positioning the milking cluster. In that case, the cow's identity should be known. These data may concern, for example, the place and size of the udder and the position of the teats on the udder.

The invention will now be described in more detail with reference to the accompanying drawings, in which FIG. 1 diagrammatically shows a side-elevational view of one embodiment of a milking cluster suitable for use in the method according to the present invention;

Figure 4:
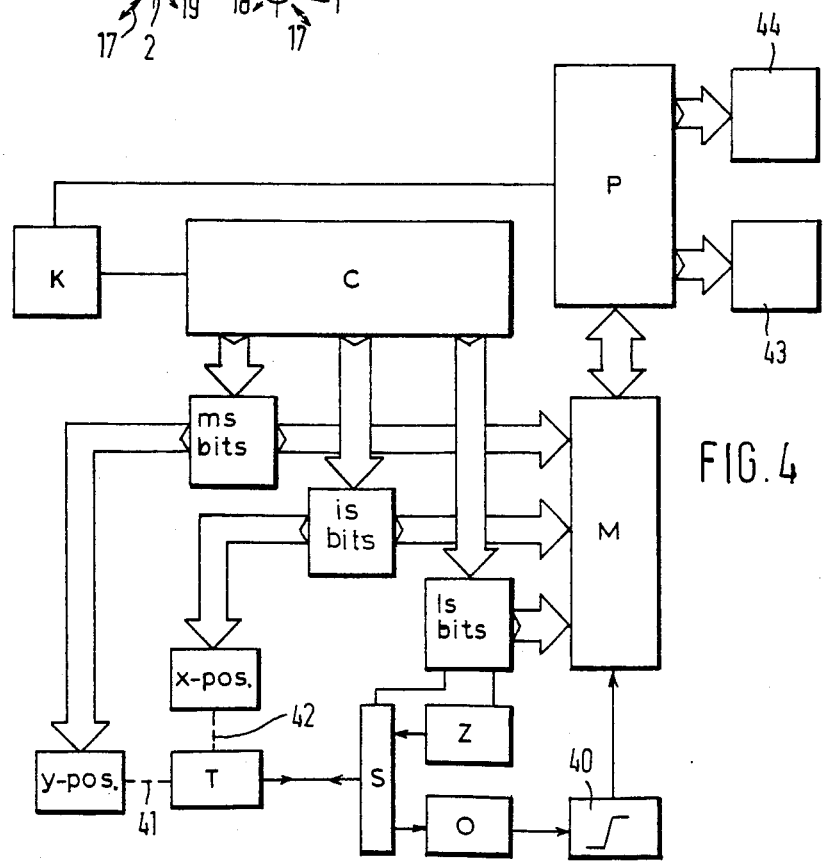
Figure 5:
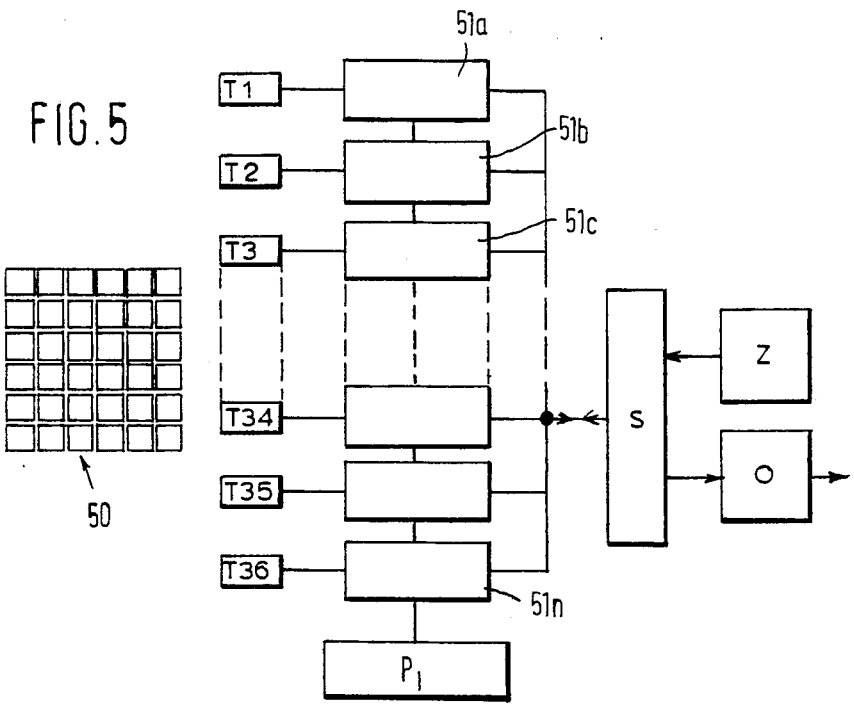
Figure 6:
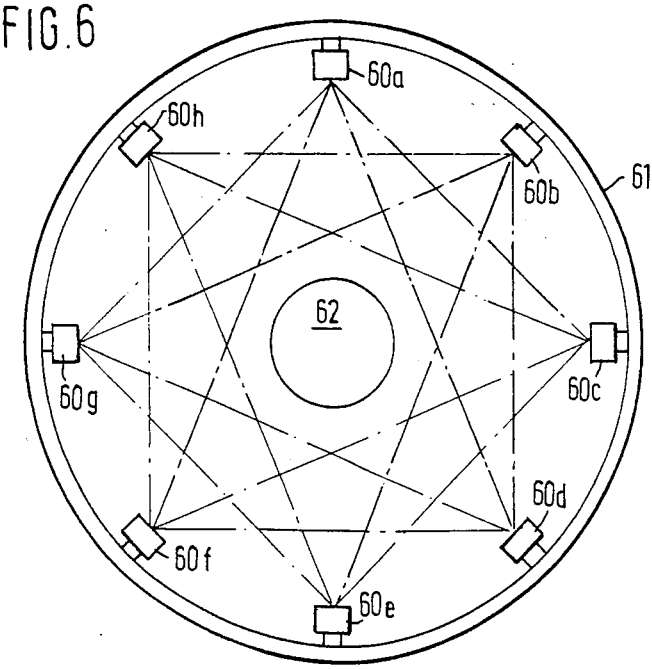

FIG. 4 diagrammatically shows a control circuit for a milking cluster;

FIG. 5 diagrammatically illustrates a variant of a portion of FIGS. 1-3 and FIG. 4;

FIG. 6 diagrammatically illustrates still another variant of the invention.

Figure 1:
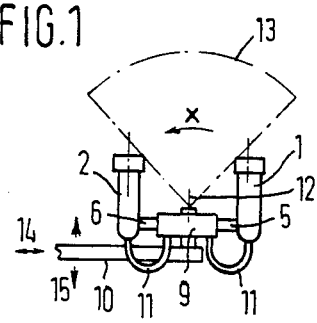
Figure 2:
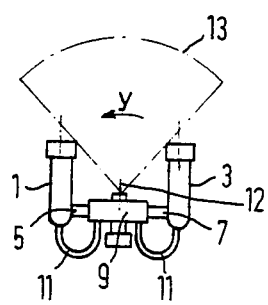
FIG. 2 shows the milking cluster of FIG. 1 in a side-elevational view turned through 90° relatively to FIG. 1.
Figure 3:
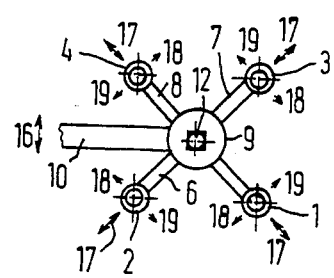
FIG. 3 shows the milking cluster of FIG. 1 and FIG. 2 in top view.

FIGS. 1-3 diagrammatically show a milking cluster for use in the method according to the present invention. The milking cluster comprises, in known manner, four teat cups 1-4, which each are secured by means of an arm 5-8 to a central carrier 9. The carrier is, in turn, secured to an arm 10. Furthermore, the bottom end of each teat cup is connected to a suction hose 11 for carrying off the milk.

In the embodiment shown, the suction hoses are connected to the central carrier 9 which is of hollow construction for the purpose. Its cavity is in communication with the interior of arm 10, which is also hollow. Naturally, it is also possible to use loose hoses.

Mounted on the central carrier, at the top in this example, is a transducer 12 for transmitting and receiving ultrasonorous waves. The ultrasonorous waves, may, for example, be in the frequency range of about 100 to about 300 kHz. By means of this transducer, a spatial area 13 located above the central carrier can be scanned for accurately determining, after coarse positioning of the milking cluster relative to the cow, the position of the teats.

It is noted that, after a first coarse positioning of the cow, realized for example by the cow being in a feeding box, it would possible first to carry out a slightly more accurate positioning step, in which the position of the udder is roughly determined. For this purpose, ultrasonorous waves can be used, too. As stated above, however, it is also possible to utilize data concerning the position of the udder of the cow in question as stored in a memory.

It is further noted that the ultrasonorous scanner may alternatively be mounted on a separate arm, whose position relative to the milking cluster is known at any moment.

The transducer is pivotable in two directions, designated by x and y in FIGS. 1 and 2.

By selecting, both in the x direction and in the y direction a number of positions in which a focussed ultrasonorous pulse is transmitted, and then measuring the time at which the first reflection of this pulse is received, there is formed a spatial polar pattern of data which, when the time information is translated into distance, via the velocity of propagation of sound in air, can be used to determine the position of the teats.

In order that, after the positions of the teats have been accurately determined, the teat cups of the milking cluster may be accurately positioned relatively to the teats, arm 10 is constructed as a robot arm which is movable in all directions, as indicated by arrows 14, 15 and 16 in FIGS. 1 and 3. Furthermore, arms 5-8 of the teat cups are telescopic and the central carrier 9 is preferably mounted for rotation on robot arm 10. In addition, arms 5-8 may be mounted for rotation relative to carrier 9. In this way the teat cups can be moved in the direction of the arrows 17, 18 and 19 as shown in FIG. 3. The drive means required to perform the desired movements of the robot arm and of the teat cups may be of any of the types known for the purpose, and are not shown herein.

The information obtained during the scanning by the transducer is used to form a spatial bit map in a memory. Owing to the manner of scanning, the information becomes available in the form of polar coordinates. Via a micro-processor, the polar coordinates are translated into carthesian coordinates, and that teat cups are adjusted to these positions, for example, by means of incremental motors, whereafter, by means of the robot arm, the entire milking cluster is raised.

FIG. 4 shows a block diagram of one example of an apparatus for controlling the scanning cycle and the positioning process. The total scanning cycle is, in this example, derived from the position of a digital counter C. The counting pulses for counter C come from a clock K. The output bits of counter C are divided into three groups of, for example, 8 bits, with the most significant group ms being used for adjusting the y scanning direction of the transducer T, for example, by means of an incremental motor not shown, the middle group is for adjusting the x scanning direction, and the least significant group ls for determining the moment when a pulse is transmited and the time which lapses before the first reflection is received. At each scanning position a short signal pulse is generated by a transmitter Z, which via an electronic switch S is passed to the transducer to be transmitted as an ultrasonorous pulse. Thereafter the electronic switch S is switched to a receiver O. The sound wave from transducer T is focussed in the scanning direction by giving this transducer a concave form or by providing an acoustic lens on this transducer, or by using a so-called annular transducer, which consists of concentric rings, with the rings being energized by the transmitted pulse with such a time shift, via delay lines, that the sound beam is focussed. At reception focussing can be realized in the same manner. So long as no reflections are received via receiver O, a "low" level is written in a memory position of a memory M, which position is determined by the position of the counter. The position of the counter at the moment the first reflection is received from the scanning direction is a measure for the time lapsed between the transmisson of the pulse and the reception of this first reflection and, the velocity of propagation of sound in air being substantially constant, also a measure for the distance of the transducer from the object against which reflection took place. In all memory positions provided for this scanning line a "high" level is written after the reception of the first reflection until the first group of least significant bits has been counted round. The writing signal is, in this example, supplied via a stage 40 to the memory. Subsequently, the x positon of the transducer is changed and the cycle repeated. The control of the position of transducer T is indicated symbolically by the blocks x-pos and y-pos and the broken lines 41 and 42. At the following scan lines the above is repeated until all x positions and all y positions have been traversed and counter C has been counted through. At this moment, a bit map in polar coordinates, defining the position of the udder and the teats, is present in memory M. By means of a processor P the polar bit map is translated through goniometric functions into a carthesian bit map, whereafter the location of the teats can be determined by reading the memory from below upwards. The teat cups are then, under the control of processor P, adjusted to the correct positions and applied to the teats by means of individual positioning and positioning of arm 10 by suitable servomechanisms 43 and 44.

A second possible embodiment of the apparatus can be obtained by giving the transducer a static position in the milking cluster and using a planar transducer consisting of a large number of transducers disposed in matrix form. When, in this case, just as in the case of the annular transducer, the various elements of the matrix are provided with a transmission pulse, shifted in time through delay lines, and during reception the various signals are again combined, shifted in time, it is possible to realize beam control in addition to focussing, and mechanical adjustment of the direction of the transducer is unnecessary. FIG. 5 illustrates diagrammatically how the various elements of a matrix-shaped transducer device 50, which in this example includes individual transducers $T_1$–$T_{36}$, shown separately, are coupled through programmable delay lines 51a–51u to receiver O and transmitter Z. The delay lines are controlled by a processor P. In the same way as with the mechanical scanner, it is now possible to make a bit map, based on polar coordinates, and the teat cups can be adjusted to the correct position.

In a third possible embodiment of the apparatus according to the invention, the bit map is produced by transmitting, via a planar transducer statically secured to the milking cluster, an omnidirectional sound beam successively per element in the matrix, and making a time registration of the signals received by the element concerned. By means of Fourier transformation to the frequency domain, based on the position of the elements in the matrix, the acoustic information can be synthetically focussed afterwards. This synthetic focussing method is known per se, and is also used in seismics, and in medical diagnostics.

In a fourth possible embodiment of the apparatus according to the invention, each teat cup is provided with a plurality of transducers, for example eight, disposed in a circle. The diameter of the circle shape is so large (about 15 cm) that, starting from the cow's position and the known position of the teats in this cow, one can be certain that the teats fall within the ring of transducers. If the teat is in the centre of the teat cup, then, if only one transducer is transmitting and the other transducers are receiving, only the sound beam in the direction of the diametrically opposite transducer is interrupted. If now, during successive transmisson pulsed, each time a next adjacent transducer is used as a transmitter and the other transducers as a receiver, and it is determined which sound paths are interrupted by the teat, the position of the teat can be ascertained. Depending thereon, the position of the teat cup can be corrected so that the teat comes to be in the centre of the ring of transducers and hence also in the centre of the teat cup. If, during this movement the milking cluster is bodily moved slowly upwards, it can be applied. FIG. 6 shows diagrammatically the position of the transducers 60a–60h in a ring 61, and the sound paths between these transducers, and also a teat 62.

In all of the embodiments described, it is of importance that the teat cups are controlled so fast that a change in the position of the teats from movements of the cow can be followed. At the moment when the milking cluser is applied, the drives of the teat cups and the robot arm can be uncoupled, because the teat cups will remain in position owing to the suction force.

It is observed that, after the above disclosure, various modifications of the invention will readily occur to those skilled in the art. Thus, in principle, it is possible, in case the data concerning the position of the udder and the teats thereon are already stored in a memory, to bring the teat cups in the correct positions relative to each other during the coarse positioning step. These data may have been obtained, for example, during a preceding automatic milking process. The apparatus is then of the learning type. During the accurate positioning step the only procedures required are then a movement of arm 10 and possibly a rotation of the central carrier relative to arm 10.

As methods of automatically removing a milking cluster are already known, the invention makes it possible to realize complete automation of the milking process. The invention is basically also applicable to dairy cattle other than cows.

I claim:

1. A method of automatically applying a milking cluster to teats on an udder of an animal characterized by the steps of coarsely positioning an animal to be milked and the milking cluster relatively to each other; accurately detecting the position of at least the animal's teats relative to at least teat cups of the milking cluster by means of ultrasonorous waves; accurately positioning the teat cups of the milking cluster relatively to the teats, starting from the detected position of the teats, and applying the teat cups to the teats.

2. A method as claimed in claim 1, characterized by starting from the previously known position of the animal in a confined space during the coarse positioning step.

3. A method as claimed in claim 1, characterized in that data concerning the position of the udder and of the teats on the udder of each animal to be milked are stored in a memory, and that the coarse positioning step is carried out on the basis of these data.

4. A method as claimed in claim 3, characterized in that, during the coarse positioning step, the positions of the teat cups relative to each other are already adjusted in conformity with the stored data concerning the position of the teats on the udder.

5. A method as claimed in claim 1, characterized in that the detection of the position of at least the teats is carried out by means of a transducer pivotable in two directions and arranged to scan a spatial region in a pre-determined sequence.

6. A method as claimed in claim 1, characterized in that the detection of the position of at least the teats is carried out by means of a transducer device built up from individual transducers disposed in a matrix form, the individual transducers being energized on a time-shift basis for focussing the ultrasonorous waves.

7. A method as claimed in claim 1, characterized in that the detection of the position of at least the teats is carried out by means of an annular transducer built up from concentric rings, the rings being energized on a time-shift basis to focus the ultrasonorous waves.

8. A method as claimed in claim 1, characterized in that the detection of the position of the teats is carried out by means of at least one transducer disposed on the milking cluster.

9. A method as claimed in claim 8, characterized in that the detection of the position of the teats is carried out by means of a plurality of transducers disposed in a ring around each teat cup of the milking cluster.

10. A method as claimed in claim 1, characterized by using for the detection of the position of at least the teats a transducer device comprising individual transducers disposed in matrix form, said individual transducers being arranged to successively transmit an omnidirectional ultrasonorous beam, following by synthetic focussing on the basis of the reflections received.

11. A method as claimed in claim 1, characterized in that the information concerning at least the position of the teats, obtained by means of the ultrasonorous waves, is stored in the form of polar coordinates, which subsequently are translated into carthesian coordinates, on the basis of which the position of the milking cluster and of the teat cups is adjusted.

12. A method as claimed in claim 11, characterized in that the coordinates are used for making a bit map of at least the position of the teats.

13. Apparatus for automatically applying a milking cluster including a pluratiy of teat cups, characterized by at least one ultrasonorous transducer device having a known position relative to the milking cluster; means for controlling said transducer device, means for processing signals generated by said transducer device to produce control signals for positioning devices for the milking cluster and the teat cups.

14. Apparatus as claimed in claim 13, characterized in that said at least one transducer device is disposed on the milking cluster.

15. Apparatus as claimed in claim 13, characterized by one single transducer capable of transmitting focussed ultrasonorous waves and receiving reflections of the waves, and capable of being pivoted in two directions.

16. Apparatus as claimed in claim 15, characterized by said single transducer being cup-shaped.

17. Apparatus as claimed in claim 15, characterized by said single transducer including an acoustic lens.

18. Apparatus as claimed in claim 13, characterized in that the transducer device is built up from a plurality of individual transducers; that the means for controlling the transducer device is arranged to energize the individual transducers on a time-shift basis, and that the means for processing the signals generated by the transducer device is arranged to combine the signals from the individual transducers on a time-shift basis.

19. Apparatus as claimed in claim 18, characterized in that the individual transducers are disposed in a matrix form.

20. Apparatus as claimed in claim 18, characterized in that the transducer device is built up from concentric annular individual transducers.

21. Apparatus as claimed in claim 18, characterized in that the means for controlling the transducer device includes an array of programmable delay lines, and that a processor is provided to control said delay lines, each delay line being connected to an individual transducer; and that the array of programmable delay lines also forms part of the means for processing the signals generated by the transducer device.

22. Apparatus as claimed in claim 13, characterized in that the transducer device is built up from a plurality of individual transducers disposed in matrix form, each of said transducers being capable of transmitting an omnidirectional ultrasonorous beam; that the means for controlling the transducer device is arranged to energize the individual transducers successively; that the means for processing the signals generated by the transducer device is arranged to from a time registration of the signals generated per individual transducer, and to store this in a memory, and to process the joint time registrations by means of synthetic focussing algorhythms in the frequency domain to form a bit map of the position of at least the teats.

23. Apparatus as claimed in claim 15, characterized in that the means for controlling the transducer comprises a digital counter, a first part of whose output signals is used to control the pivotal movement of the transducer in one direction, and a second part of whose output signals is used for controlling the pivotal movement of the transducer in the other direction, a third part of these output signals of the counter being used to energize the transducer at the moments desired.

24. Apparatus as claimed in claim 13, characterized in that the means for positioning the milking cluster includes a robot arm that is movable in all directions, and a central carrier mounted for rotation at the end of said robot arm, said central carrier including a plurality of radial arms each carrying a teat cup.

25. Apparatus as claimed in claim 24, characterized in that said radial arms are telescopic.

26. Apparatus as claimed in claim 25, characterized in that the angle between the radial arms is adjustable.

27. Apparatus as claimed in claim 24, characterized in that the central carrier and the rotor arm are hollow and together form a liquid duct and that the teat cups are connected to the central carrier through hoses.

28. Apparatus as claimed in claim 13, characterized by the provision of a ring of transducers on each teat cup, said ring being of surch diameter that, after coarse positioning, the teats are at any rate each disposed within a ring when the milking cluster is raised, and that the means for controlling the transducers is arranged to energize successively one transducer in each ring and switching the other transducers of the ring as receivers, the means for processing the signals generated by the transducers being arranged to determine the position of the teat within the ring concerned on the basis of the presence or absence of output signals from the transducers connected as receivers, and to form control signals for the positioning means of at least the teat cups.

29. Apparatus for applying a milking cluser to teats of an animal, said apparatus comprising:
a milking cluster having teat cups,
detection means for detecting by ultrasonic waves the positions of teats of an animal relative to said teat cups, and
means for positioning said teat cups relative to the teats and applying said teat cups to the teats based upon the detected positions of the teats.

30. Apparatus as in claim 29, wherein said means for positioning and applying includes an arm supporting said teat cups.

31. Apparatus as in claim 30, wherein said teat cups are mounted on a central carrier supported by said arm.

32. Apparatus as in claim 31, wherein said teat cups are movable radially and angularly with respect to said central carrier.

33. Apparatus as in claim 32, wherein said central carrier is vertically movable by said arm to register with the teats.

34. Method of applying teat cups to teats of an animal, said method comprising:
detecting by ultrasonic waves the positions of teats of an animal relative to a plurality of teat cups,
positioning the teat cups relative to the detected positions of the teats, and
applying the teat cups to the teats.

35. Method as in claim 34, wherein the relative positioning of the teat cups corresponds with the detected positions of the teats.

36. Method as in claim 35, wherein the teat cups are vertically moved to be applied to the teats.

37. Method as in claim 36, wherein the teat cups are independently positionable.

38. Method as in claim 37, wherein all of the teat cups are movable simultaneously.

* * * * *